(12) United States Patent
Marquie et al.

(10) Patent No.: US 10,975,722 B2
(45) Date of Patent: Apr. 13, 2021

(54) OUTLET GUIDE VANE FOR AN AIRCRAFT TURBOMACHINE, COMPRISING A LUBRICANT COOLING PASSAGE EQUIPPED WITH FLOW DISTURBING STUDS WITH SIMPLIFIED MANUFACTURING

(71) Applicant: SAFRAN AIRCRAFT ENGINES, Paris (FR)

(72) Inventors: Dimitri Daniel Gabriel Marquie, Moissy-Cramayel (FR); Geoffray Henri Robert Leguery, Moissy-Cramayel (FR); Pierre François Senejoux, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 12 days.

(21) Appl. No.: 16/614,852

(22) PCT Filed: May 17, 2018

(86) PCT No.: PCT/FR2018/051193
§ 371 (c)(1),
(2) Date: Nov. 19, 2019

(87) PCT Pub. No.: WO2018/215712
PCT Pub. Date: Nov. 29, 2018

(65) Prior Publication Data
US 2020/0182086 A1 Jun. 11, 2020

(30) Foreign Application Priority Data
May 22, 2017 (FR) ...................................... 1754544

(51) Int. Cl.
*F01D 25/12* (2006.01)
*F01D 9/04* (2006.01)

(52) U.S. Cl.
CPC ............. *F01D 25/12* (2013.01); *F01D 9/041* (2013.01)

(58) Field of Classification Search
CPC .......... F01D 25/12; F01D 9/041; F01D 9/065; F01D 5/20; F01D 5/12
See application file for complete search history.

(56) References Cited

U.S. PATENT DOCUMENTS

| 8,616,834 B2 | 12/2013 | Knight, III et al. |
| 2012/0207591 A1 | 8/2012 | Lee et al. |

(Continued)

FOREIGN PATENT DOCUMENTS

FR 2989110 B1 9/2016

OTHER PUBLICATIONS

Search Report issued in French Patent Application No. 17 54544 dated Jan. 8, 2018.

(Continued)

*Primary Examiner* — Long T Tran
(74) *Attorney, Agent, or Firm* — Pearne & Gordon LLP

(57) ABSTRACT

The invention relates to a guide vane intended to be arranged in all or part of an air flow of an aircraft bypass turbomachine fan, the vane comprising an aerodynamic part equipped with at least one interior lubricant cooling passage delimited in part by an intrados wall and an extrados wall of the vane, there being flow-disturbing lugs, made as one piece with one of the intrados and extrados walls, passing across the passage. According to the invention, in any plane of section passing orthogonally through the lugs, the space defined between these lugs has a geometry defined exclusively by a set of annulus shapes of the same dimensions, partially overlapping one another and each in part delimiting at least two of these lugs.

10 Claims, 6 Drawing Sheets

(56) References Cited

U.S. PATENT DOCUMENTS

| | | | | |
|---|---|---|---|---|
| 2016/0230564 A1* | 8/2016 | Mongillo, Jr. | .......... | F01D 5/187 |
| 2017/0051623 A1* | 2/2017 | Romanov | ............... | F01D 11/08 |
| 2017/0284417 A1* | 10/2017 | Zaccardi | .................. | F02C 7/14 |
| 2018/0258779 A1* | 9/2018 | Boutaleb | ................. | F01D 9/041 |
| 2019/0078452 A1* | 3/2019 | Zaccardi | ................... | F02K 3/06 |
| 2019/0186293 A1* | 6/2019 | Boutaleb | ................. | F01D 25/12 |
| 2019/0249558 A1* | 8/2019 | Zaccardi | .............. | F04D 29/542 |
| 2019/0338661 A1* | 11/2019 | Zaccardi | ................ | F01D 5/188 |

OTHER PUBLICATIONS

International Search Report issued in Application No. PCT/FR2018/051193 dated Jul. 13, 2018.

Written Opinion issued in Application No. PCT/FR2018/051193 dated Jul. 13, 2018.

* cited by examiner

OUTLET GUIDE VANE FOR AN AIRCRAFT TURBOMACHINE, COMPRISING A LUBRICANT COOLING PASSAGE EQUIPPED WITH FLOW DISTURBING STUDS WITH SIMPLIFIED MANUFACTURING

This is the National Stage application of PCT international application PCT/FR2018/051193, filed on May 17, 2018 entitled "GUIDE VANE, ASSOCIATED TURBOMACHINE AND ASSOCIATED MANUFACTURING METHOD", which claims the priority of French Patent Application No. 17 54544 filed May 22, 2017, both of which are incorporated herein by reference in their entirety.

TECHNICAL FIELD

The present invention relates to the field of aircraft dual flow turbomachines, and in particular to the design of the guide vanes arranged in all or part of an airflow of a fan of the turbomachine.

These are preferably Outlet Guide Vanes (OGV), provided to straighten the airflow at the outlet of the fan. Alternatively or simultaneously, guide vanes could possibly be placed at the inlet of the fan. The guide vanes are conventionally arranged in the secondary path of the turbomachine.

The invention preferably relates to an aircraft turbojet engine equipped with such outlet guide vanes. It also relates to a method for manufacturing such a vane.

STATE OF PRIOR ART

On some dual flow turbomachines, it is known to provide outlet guide vanes downstream of the fan to straighten the flow which exhausts therefrom, and also possibly to provide a structural function. The latter function actually aims at enabling loads to switch from the centre of the turbomachine, to an external shell extending from the fan casing. In this case, an engine mount is conventionally arranged on or in the proximity of this external shell, to ensure attachment between the turbomachine and an engine mounting structure of the aircraft.

Recently, it has also been suggested to assign an additional function to the outlet guide vanes. This is a heat exchange function between ambient air passing through the ring of outlet guide vanes, and lubricant circulating inside these vanes. This heat exchange function is for example known from document U.S. Pat. No. 8,616,834, or even document FR 2 989 110.

The lubricant for being cooled by the outlet guide vanes can come from different zones of the turbomachine. Actually, it can be a lubricant circulating through lubrication enclosures of the rolling bearings supporting the engine shafts and/or the fan hub, or even a lubricant dedicated to the lubrication of the mechanical transmission elements of the Accessory Geared Box (AGB). Finally, it can be used to lubricate a fan driving speed reducer, when such a speed reducer is provided on the turbomachine in order to decrease the rotation speed of its fan.

The growing needs for lubricant require to adapt the heat dissipation capability accordingly, which is associated with the exchangers for cooling the lubricant. Assigning a heat exchanger role to the outlet guide vanes, as in the solutions of both aforementioned documents, enables in particular ACOC (Air Cooled Oil Cooler) type conventional exchangers to be decreased, or even removed. Since these ACOC exchangers are generally arranged in the secondary path, their decrease/removal enables secondary flow disturbances to be limited, and thus the turbomachine overall efficiency to be increased.

Within the lubricant cooling internal passage, it is possible to provide studs for disturbing the lubricant flow and increasing the wet surface, for the purpose of ensuring a better heat exchange. However, the manufacture of these studs can turn out to be lengthy and/or expensive. Several techniques have already been contemplated like conventional machining, using a conventional cutter, for example with a diameter of 5 mm. With this technique using a so-called "round" cutter, the volume of matter to be removed is very high (for example in the order of 1.5 kg per vane), which represents a significant number of machining hours and implies a high manufacturing cost.

Another contemplated technique is Electrical Discharge Machining (EDM). However, the implementation of this technique implies a significant tooling cost.

Consequently, there remains a need for a design facilitating manufacturing of such a vane with an integrated exchanger.

DISCLOSURE OF THE INVENTION

To meet at least partially this need, a first object of the invention is a guide vane for being arranged in all or part of an airflow of a fan of an aircraft dual flow turbomachine, the guide vane comprising a root, an edge, as well as a flow straightening aerodynamic part arranged between the root and the edge of the vane, said aerodynamic part of the vane including at least one lubricant cooling internal passage partly delimited by a front side wall and a back side wall of the vane, flow disturbing studs made as a single piece with one of the front side and back side walls passing through said passage.

According to the invention, in any section plane orthogonally passing through the studs, the space defined between these studs has a geometry exclusively defined by a set of rings with a same dimension, partially covering each other and each partly delimiting at least two of these studs.

Another object of the invention is a method for manufacturing a guide vane for being arranged in all or part of an airflow of a fan of an aircraft dual flow turbomachine, the guide vane comprising a root, an edge, as well as a flow straightening aerodynamic part arranged between the root and the edge of the vane, said aerodynamic part of the vane including at least one lubricant cooling internal passage partly delimited by a front side wall and a back side wall of the vane, flow disturbing studs made as a single piece with one of the front side and back side walls passing through said passage.

According to the invention, the method comprises a step of making the studs by repeatedly machining said one of the front side and back side walls using a chamfering cutter, this step being implemented such that the remaining parts not machined by said chamfering cutter form said studs.

Thus, the invention judiciously provides the use of a particular cutting tool to make machinings, that is a chamfering cutter which makes it possible to let projecting parts remain which, after the repeated machining, form the flow disturbing studs in the lubricant cooling internal passage. The manufacture of the vane is thereby facilitated, and its cost is substantially reduced.

The invention preferably provides at least any of the following optional characteristics, taken alone or in combination.

In said section plane, each stud is delimited by four sides each having an arc of circle shape. Alternatively, some studs could be delimited by two or three sides, each having an arc of circle shape.

Said set of rings is made by alternating first and second rows of rings partially overlapping each other and succeeding each other along a span direction of the vane, each first row preferably comprising a number N of rings and each second row preferably comprising a number N−1 of rings, the centres of these rings being disposed in a staggered manner so as to define alternating first rows of studs each comprising a number N+1 of studs and second rows of studs each comprising a number N of studs. Preferably, the number N is between 2 and 5.

In this regard, it is noted that the number of rings per row essentially depends on the vane chord line, the internal and external diameters of the chamfering cutter, and the centre-to-centre distance between two consecutive passages of this cutter.

The rings of the set have an external diameter between 20 and 50 mm and an internal diameter between 5 and 20 mm.

Said one of the front side and back side walls equipped with the studs is part of a body of the vane, or a cap for closing this body.

The other of the elements from the front side and back side walls is made as a single piece with additional flow disturbing studs. Moreover, in any section plane orthogonally passing through the additional studs, the space defined between these additional studs has a geometry exclusively defined by a set of additional rings with a same dimension, partially covering each other and each partly delimiting at least two of these additional studs.

The additional studs penetrate the space defined between the studs, and the studs penetrate the space defined between the additional studs.

The repeated machining using the chamfering cutter is made along parallel machining axes, preferably arranged in a staggered manner. However, small angles can be provided between these machining axes, in particular when repeated machining is made with orthogonal axes locally to an average surface of the twisted vane, which has preferably a substantially constant thickness at the passages.

Finally, another object of the invention is an aircraft turbomachine, preferably a turbojet engine, comprising a plurality of guide vanes as the one described above, arranged downstream or upstream of a fan of the turbomachine.

Further advantages and characteristics of the invention will appear in the detailed non-limiting description below.

BRIEF DESCRIPTION OF THE DRAWINGS

This description will be made with regard to the appended drawings in which.

DETAILED DISCLOSURE OF PREFERRED EMBODIMENTS

Figure 1:
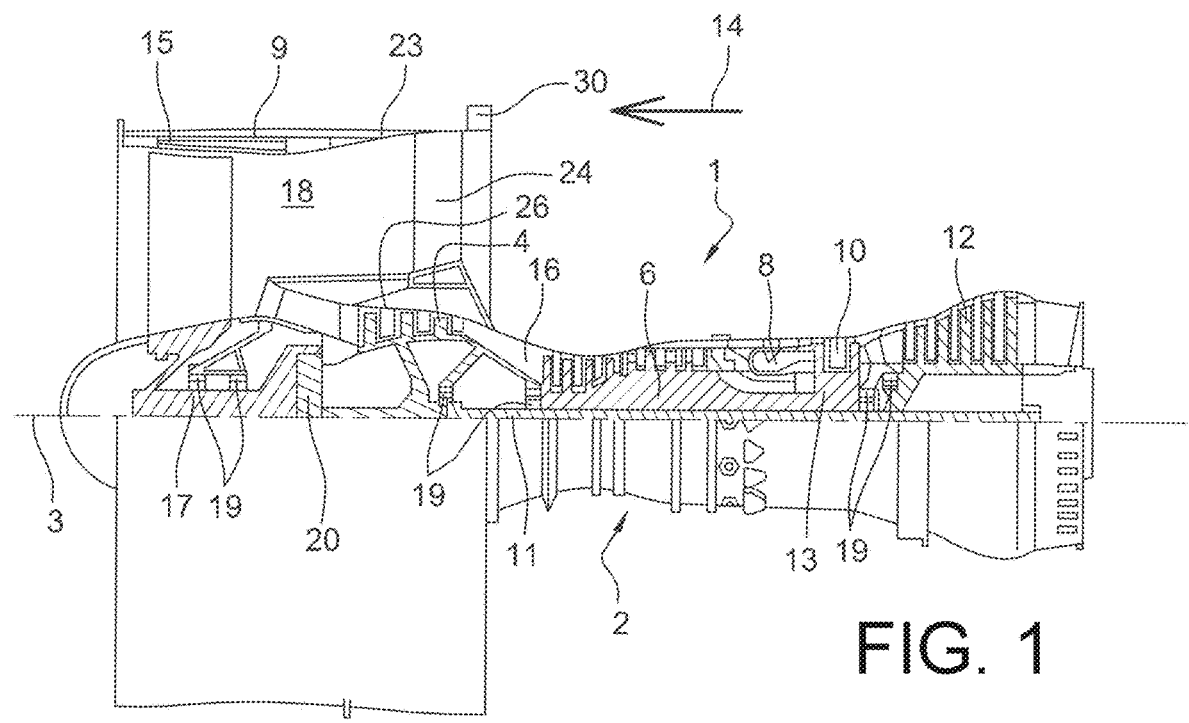
FIG. 1 represents a side schematic view of a turbojet engine according to the invention.

In reference to FIG. 1, a dual flow twin spool turbojet engine 1 having a high dilution rate is represented. The turbojet engine 1 conventionally includes a gas generator 2 on either side of which a low pressure compressor 4 and a low pressure turbine 12 are arranged, this gas generator 2 comprising a high pressure compressor 6, a combustion chamber 8 and a high pressure turbine 10. In the following, the terms "front" and "rear" are considered along a direction 14 opposite to the main flow direction of the gases within the turbojet engine, this direction 14 being parallel to the longitudinal axis 3 thereof. On the other hand, the terms "upstream" and "downstream" are considered along the main flow direction of the gases within the turbojet engine.

The low pressure compressor 4 and the low pressure turbine 12 form a low pressure body, and are connected to each other through a low pressure shaft 11 centred on the axis 3. Likewise, the high pressure compressor 6 and the high pressure turbine 10 form a high pressure body, and are connected to each other through a high pressure shaft 13 centred on the axis 3 and arranged about the low pressure shaft 11. The shafts are supported by rolling bearings 19, which are lubricated by being arranged in oil tanks. The same is true for the fan hub 17, also supported by rolling bearings 19.

The turbojet engine 1 includes on the other hand, at the front of the gas generator 2 and of the low pressure compressor 4, a single fan 15 which is here arranged directly at the rear of an air inlet cone of the engine. The fan 15 is rotatable about the axis 3, and surrounded by a fan casing 9. In FIG. 1, it is not directly driven by the low pressure shaft 11, but only indirectly driven by this shaft via a speed reducer 20, which enables it to rotate with a slower speed. However, a solution with a direct drive for the fan 15, for example the low pressure shaft 11, falls within the scope of the invention.

Further, the turbojet engine 1 defines a primary path 16 through which a primary flow passes, as well as a secondary path 18 through which a secondary flow located radially outwardly with respect to the primary flow passes, the fan flow being thus divided. As is known by those skilled in the art, the secondary path 18 is partly delimited radially outwardly by a preferentially metal external shell 23, extending rearwardly of the fan casing 9.

Although not represented, the turbojet engine 1 is equipped with a set of pieces of equipment, for example of the fuel pump, hydraulic pump, AC generator, starter, Variable Stator Vane (VSV) actuator, variable bypass valve actuator, or even electric power generator type. It is in particular an equipment for lubricating the speed reducer 20.

These pieces of equipment are driven by an Accessory Geared Box or AGB (not represented), which is also lubricated.

Downstream of the fan 15, in the secondary path 18, a ring of guide vanes which are here Outlet Guide Vanes (OGV) 24 are provided. These stator vanes 24 connect the external shell 23 to a casing 26 surrounding the low pressure compressor 4. They are circumferentially spaced from each other, and enable the secondary flow to be straightened after passing through the fan 15. In addition, these vanes 24 can also provide a structural function, as is the case in exemplary embodiments which are presently described. They ensure transfer of loads from the speed reducer and the rolling bearings 19 of the engine shafts and the fan hub, to the external shell 23. Then, these loads can pass through an engine mount 30 attached to the shell 23 and connecting the turbojet engine to a mounting structure (not represented) of the aircraft.

Finally, the outlet guide vanes 24 ensure, in the exemplary embodiments presently described, a third heat exchange function between the secondary airflow passing through the ring of vanes, and the lubricant circulating inside these vanes 24. The lubricant to be cooled by the outlet guide vanes 24 is that used for lubricating the rolling bearings 19, and/or the pieces of equipment of the turbojet engine, and/or the accessory gearbox, and/or the speed reducer 20. These vanes 24 are thus part of the fluid circuit(s) in which the lubricant is circulated to successively lubricate the associated element(s), and then to be cooled.

In reference now to FIGS. 2 to 5, one of the outlet guide vanes 24 will be described, according to a first preferred embodiment of the invention. In this regard, it is noted that the invention as it will be described in reference to FIGS. 2 to 5 can be applied to all the vanes 24 of the stator ring centred on the axis 3, or only to some of these vanes.

Figure 2:
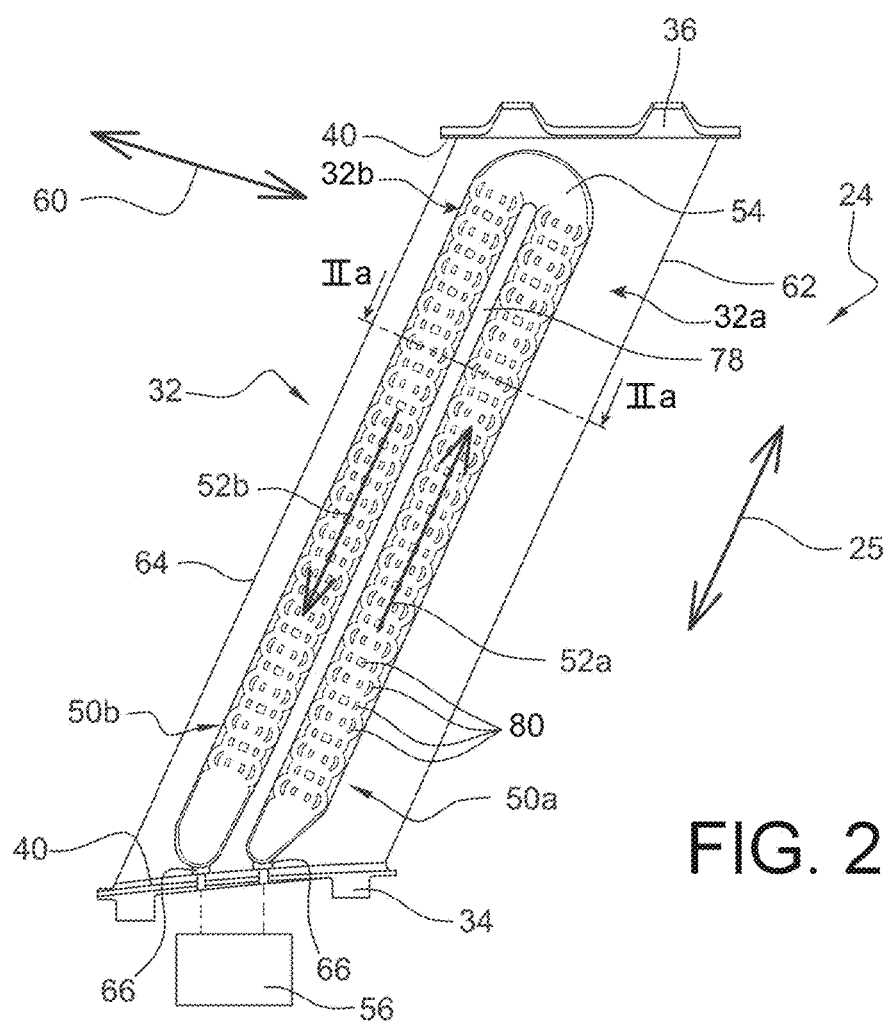
FIG. 2 represents a more detailed enlarged view of an outlet guide vane of the turbojet engine shown in the previous figure, according to a first preferred embodiment of the invention.
Figure 2A:
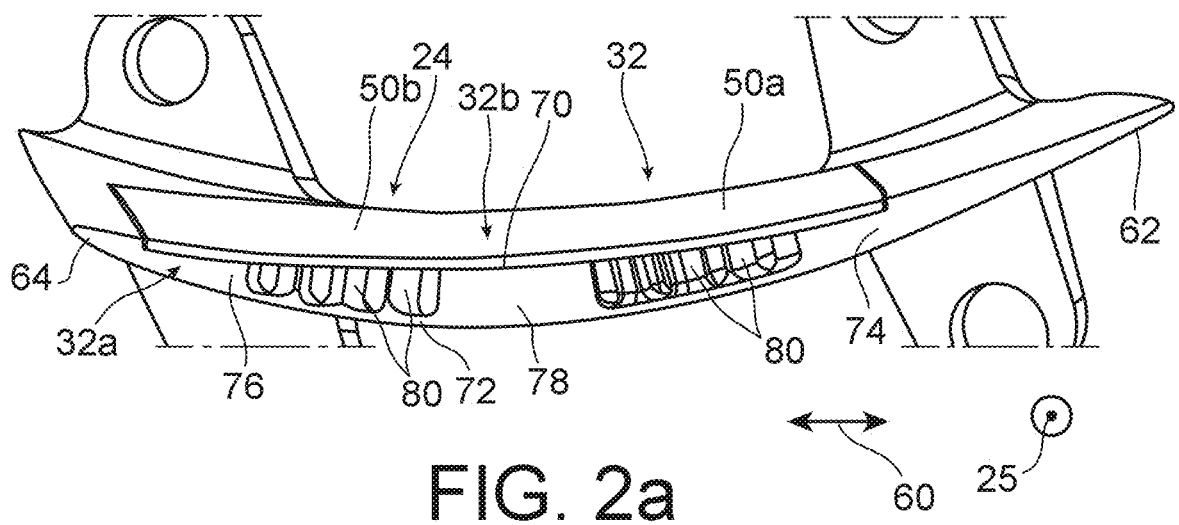
FIG. 2a is a cross-section view taken along line IIa-IIa of FIG. 2.
Figure 3:
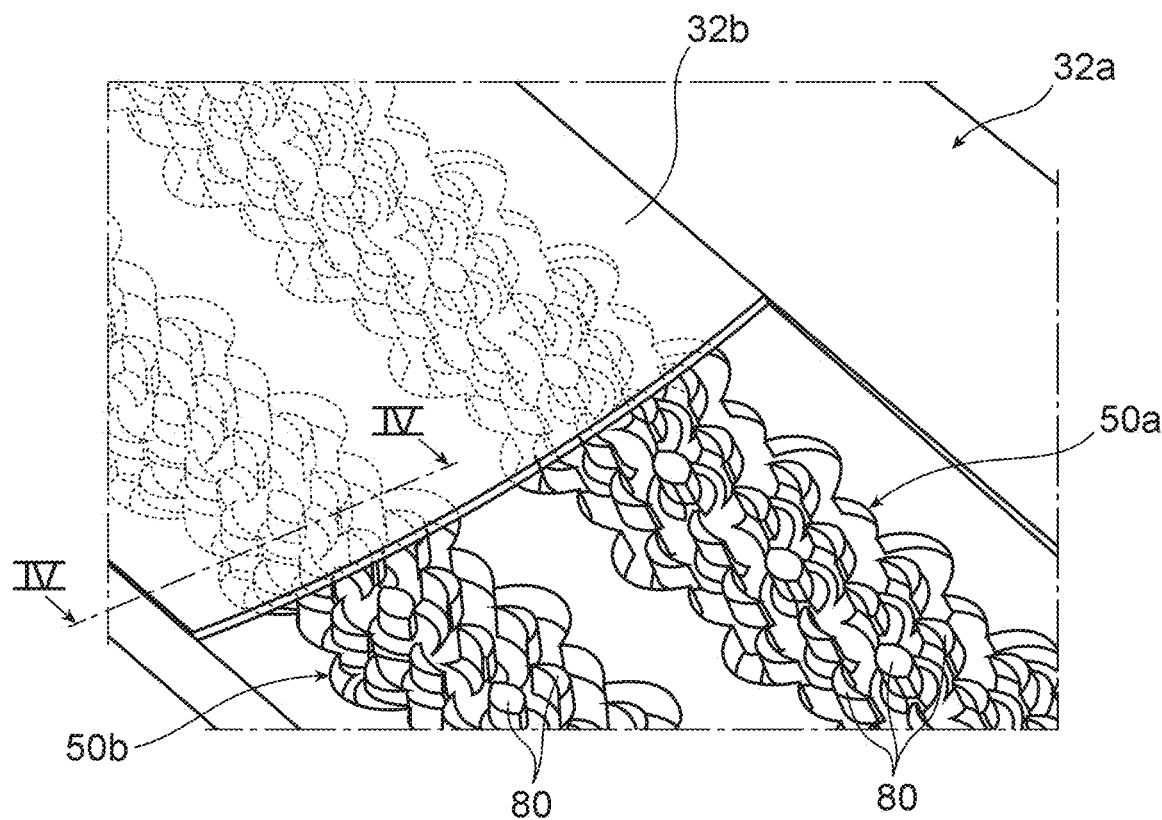
FIG. 3 is a perspective enlarged view of a part of the outlet guide vane shown in the previous figure.
Figure 4:
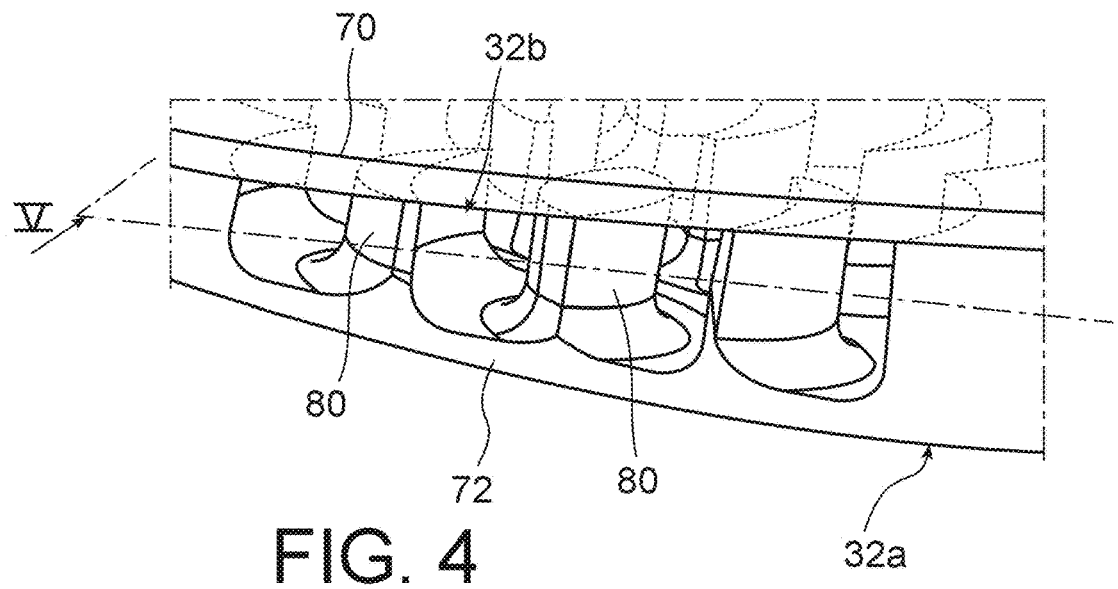
FIG. 4 corresponds to a cross-section view taken along line IV-IV of FIG. 3.

The vane 24 can be of a strictly radial orientation as in FIG. 1, or be slightly axially tilted as is shown in FIG. 2. In any case, it is preferentially straight in a side view as shown in FIG. 2, by extending along a span direction 25.

The outlet guide vane 24 includes an aerodynamic part 32 which corresponds to its central part, that is that exposed to the secondary flow. On either side of this aerodynamic part 32 used for straightening the flow exiting the fan, the vane 24 respectively includes a root 34 and an edge 36.

The root 34 is used for attaching the vane 24 to the casing of the low pressure compressor, whereas the edge is used for attaching the same vane on the external shell extending from the fan casing. Moreover, the vane 24 comprises at its root and its edge, platforms 40 used for remaking the secondary path between the vanes 24, in the circumferential direction.

The aerodynamic part 32 of the vane is preferentially made in two distinct parts, then fixedly secured to each other. One part is a body of the vane 32a, which comprises not only most of the aerodynamic part 32, but also the root 34, the edge 36 and the platforms 40. This body 32a is made as a single piece. The other part is formed by a cap 32b closing the body, and attached to the same by a conventional technique such as welding, brazing or even bonding.

In this first preferred embodiment of the invention, the aerodynamic part 32 is equipped with two internal passages 50a, 50b substantially parallel to each other, and parallel to the span direction 25. More precisely, this is a first lubricant cooling internal passage 50a, which extends along a first main lubricant flow direction 52a. This direction 52a is substantially parallel to the span direction 25, and has a direction from the root 34 to the edge 36. Analogously, a second internal passage 50b for cooling lubricant is provided, which extends along a second main lubricant flow direction 52b within this passage. This direction 52b is also substantially parallel to the span direction 25, and has a reverse direction from the edge 36 to the root 34. The first passage 50a is thus contemplated such that the lubricant radially outwardly pass therethrough, whereas the second passage 50b is contemplated such that it is radially inwardly passed therethrough. To ensure passage from one to the other, in the proximity of the edge 36, the outer radial ends of both passages 50a, 50b are fluidly connected by a 180° bend 54, corresponding to a trough made in the aerodynamic part 32. Alternatively, the passages 50a, 50b are not connected within the aerodynamic part 32 of the vane 24, but each separately extend on the entire length of the aerodynamic part 32. To fluidly connect one to the other outside the vane 24, a connecting bend arranged radially outwardly with respect to the vane edge 36, for example abutting against this edge is for example provided.

The inner radial ends of both passages 50a, 50b are in turn connected to the lubricant circuit 56, depicted by the element 56 in FIG. 2. This circuit 56 comprises in particular a pump (not represented), making it possible to apply to the lubricant the desired circulation direction within the passages 50a, 50b, namely lubricant introduction through the inner radial end of the first passage 50a, and lubricant extraction through the inner radial end of the second passage 50b. Connections 66 ensure fluid communication between the inner radial ends of the passages 50a, 50b and the circuit 56, these connections 66 passing through the root 34.

Both passages 50a, 50b as well as the bend 54 together have generally a U shape, with the first passage 50a and the second passage 50b offset from each other along a transverse direction 60 of the vane substantially orthogonal to the span direction 25. To optimise heat exchanges at best, the first passage 50a is located on the side of a trailing edge 62 of the vane 24, whereas the second passage 50b is located on the side of a leading edge 64. However, a reverse situation could be retained, without departing from the scope of the invention. It is also noted that the invention could provide an aerodynamic part 32 with a single cooling internal passage, without departing from the scope of the invention. In this case, the lubricant would pass through some vanes from inside to outside, whereas it would pass through other vanes in the reverse direction.

The aerodynamic part 32 of the outlet guide vane 24 includes a front side wall 70, a back side wall 72, a solid zone 74 connecting both walls 70, 72 in the proximity of the trailing edge 62, a solid zone 76 connecting both walls 70, 72 in the proximity of the leading edge 64, as well as a central solid zone 78. The latter zone 78 connects both walls 70, 72 at a substantially central portion thereof, along the chord line direction of the vane. It is also used as a structural reinforcement and extends from the root 34 to the bend 54, whereas the solid zones 74, 76 extend substantially on the entire length of the part 32, along the span direction 25. The first passage 50a is formed between the walls 70, 72 and between the solid zones 74, 78, whereas the second passage 50b is formed between the walls 70, 72 and between the solid zones 76, 78. The front side and back side walls 70, 72 have, with respect to the passages 50a, 50b they delimit, substantially constant thicknesses. On the other hand, the passages 50a, 50b extend transverse along the direction 60 by having a variable thickness between both walls 70, 72. The maximum thickness of these passages could be in the order of a few millimetres. Alternatively, the passages 50a, 50b could have a constant thickness, but in this case both walls 70, 72 would thereby assume a variable thickness to obtain the aerodynamic profile of the vane.

It is noted that the back side wall 72 is integrated to the body 32a of the vane, whereas the front side wall 70 is integrated to the cap 32b, the latter extending between the solid zones 74, 76 it partly forms.

Both internal lubricant cooling passages 50a, 50b have the feature of integrating flow disturbing studs. In the first preferred embodiment, these studs 80 are made as a single piece with the back side wall 72, in the body 32a of the vane. These studs 80 are made projecting towards the front side wall 70, and they equip each internal passage 50a, 50b. The arrangement and shape of the studs 80 are substantially identical or analogous in both passages 50a, 50b. They are also provided with same densities, although it can be otherwise, without departing from the scope of the invention. Consequently, only the studs 80 of the first internal passage 50a will know be described, but it is to be understood that this description is also applicable by analogy to the studs of the second internal passage 50b. On the other hand, it is noted that the bend 54 defines an internal space which is preferentially free of studs.

The studs 80 in the first passage 50a are substantially orthogonal to the direction 52a. The stud height along the same direction is for example in the order of one or more millimetres, whereas their thickness takes a changing value preferably between 0.5 and 3 mm. In at least one zone of the passage 50a, and preferably in the entirety of the same, the studs 80 are provided in a density for example of about 3 studs/cm$^2$. More generally, the density is for example between about 1 and 5 studs/cm$^2$ on average. In this regard, it is noted that the stud density depends on the geometry of the chamfering cutter, with its internal and external diameters characteristics. The purpose is both to have as low as possible a diameter ratio, and as low as possible an external diameter value in order to increase the stud density. In the figures, the stud density obtained is in the order of 2 studs/cm$^2$.

Figure 5:
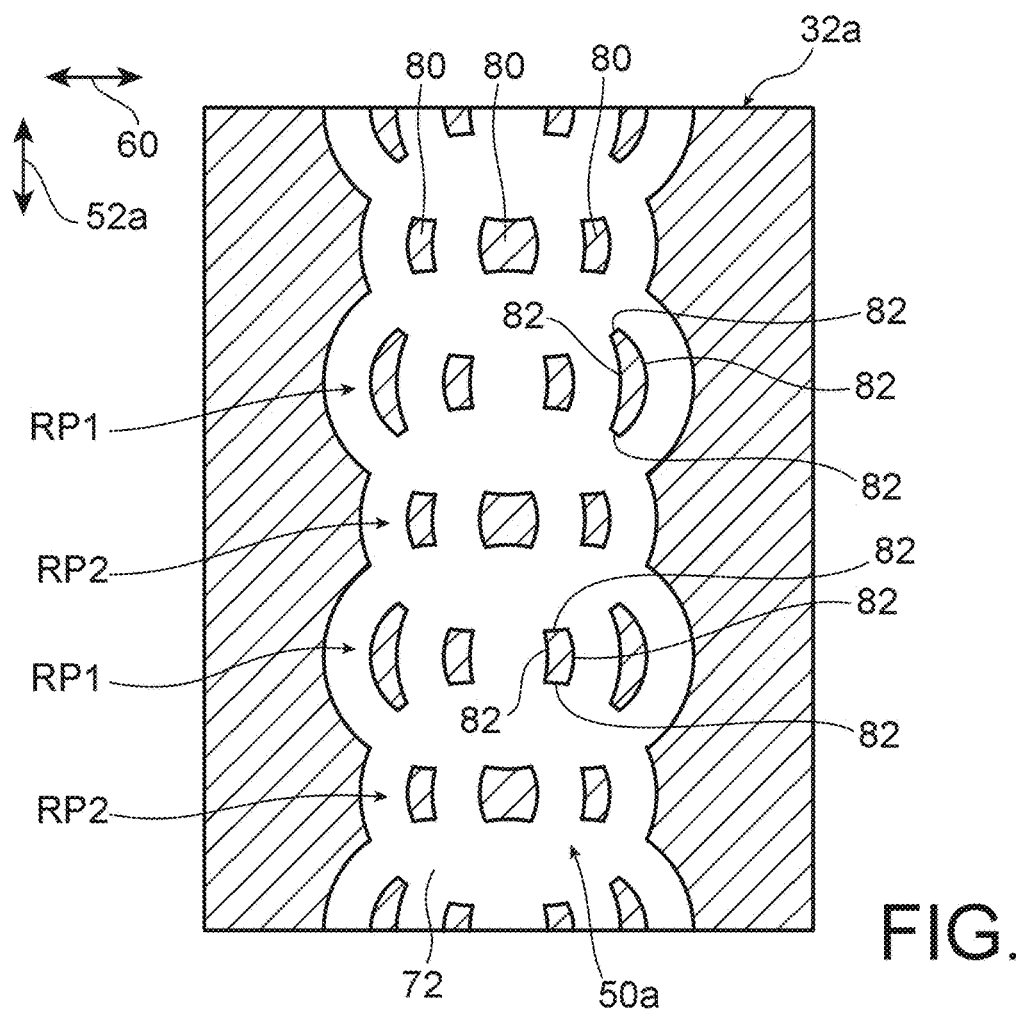
FIG. 5 represents a cross-section partial view along the plane V of FIG. 4, orthogonally passing through the flow disturbing studs.

In reference more specifically to FIG. 5, the studs 80 are distributed in rows of studs RP1, RP2 which alternately succeed along the first direction 52a, each row being substantially straight and parallel to the transverse direction 60. In the passage 50a, these are several tens of rows of fins which succeed each other along the first direction 52a. Further, within each row, the studs 80 are spaced apart from each other quite evenly along the direction 60.

The first rows of studs RP1 each comprise four studs 80, whereas the second rows of studs RP2 each comprise three studs 80. All these studs are arranged in a staggered manner, for a better lubricant flow disturbance, and an enhanced heat exchange.

Another feature of the invention resides in the manufacture of these studs 80 by machining the back side wall 72 using a chamfering cutter. Thus, in any cross-section orthogonal to the studs 80 such as that of FIG. 5, each stud 80 is here defined by four sides 82 each having an arc of circle shape. The four arcs of circle of all the studs have only two different diameters, namely a first diameter corresponding to an external diameter of the chamfering cutter used for the repeated machining, and a second diameter corresponding to an internal diameter of the chamfering cutter.

Figure 6:
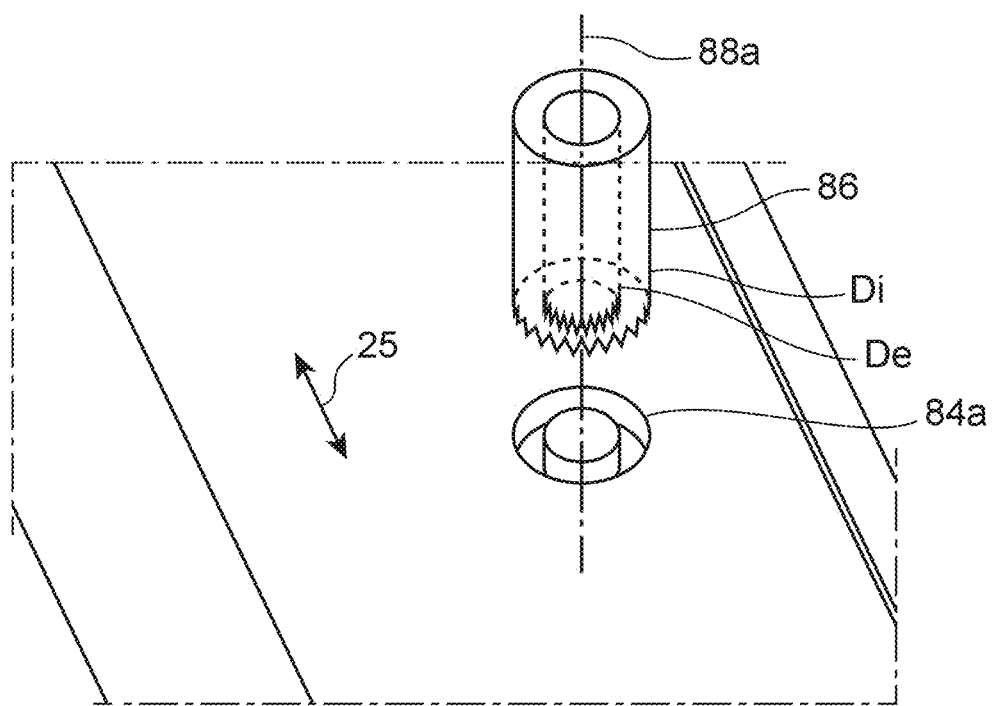
FIGS. 6 and 7 are perspective views depicting repeated machining for forming the studs shown in FIG. 5.
Figure 7:
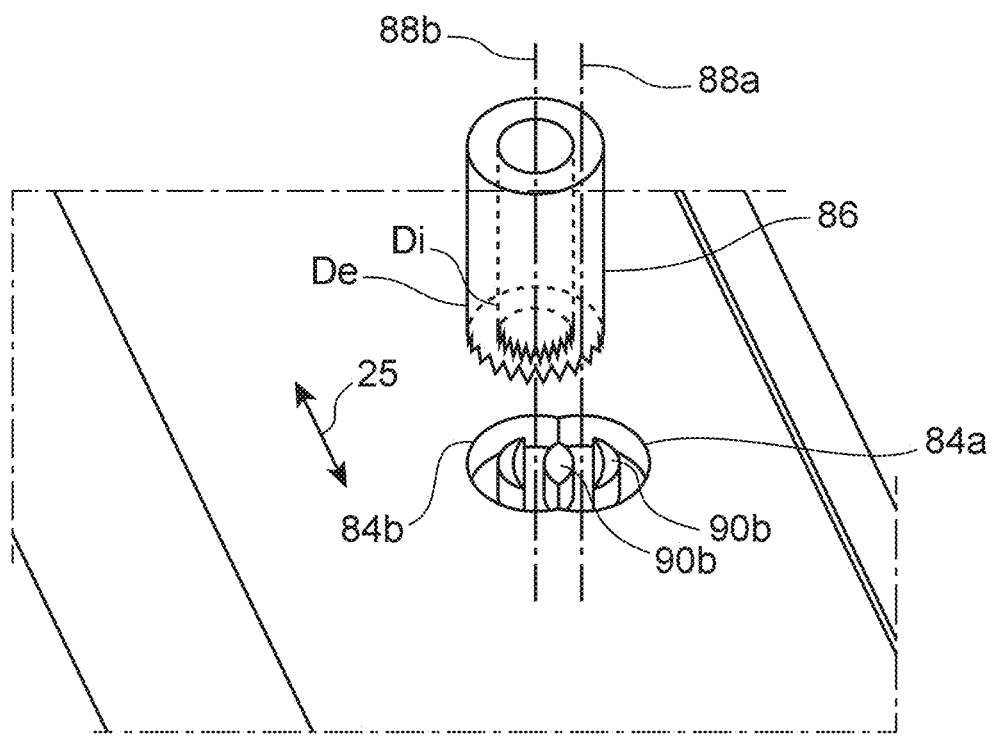

This chamfering cutter is shown in FIGS. 6 and 7, which depict part of a method for manufacturing the vane according to a preferred embodiment.

In FIG. 6, a first machining 84a is shown, made with the chamfering cutter 86 along a first machining axis 88a orthogonal to the span direction 25. This first machining, made in the back side wall 72 still in the row material state within the body 32a of the vane, reveals a first projection 90a with a circular cross-section. This projection is provided to make up two distinct studs 80 at the end of the step of making the studs through machining. This step is indeed continued with a second machining 84b made with the same chamfering cutter 86 along a second machining axis 88b distinct from and parallel to the first axis 88a, as shown in FIG. 7. This second machining made in the back side wall 72 reveals two second projections 90b with a circular cross-section and coming from the first projection 90a. They are respectively provided to make up two distinct studs 80 at the end of the step of making the studs.

Machining is thus repeated with the same chamfering cutter 86, along parallel machining axes which are offset from each other. As discussed previously, small angles could be provided between these machining axes, when a repeated machining with axes locally orthogonal to an average surface of the twisted vane is made. Each machining creates a toric-shaped fingerprint in the back side wall 72, these fingerprints partially overlapping each other to result in the desired configuration for the studs 80. Each fingerprint then has an internal diameter corresponding to the internal diameter "Di" of the chamfering cutter 86, as well as an external diameter corresponding to the external diameter "De" of this cutter.

Figure 8:
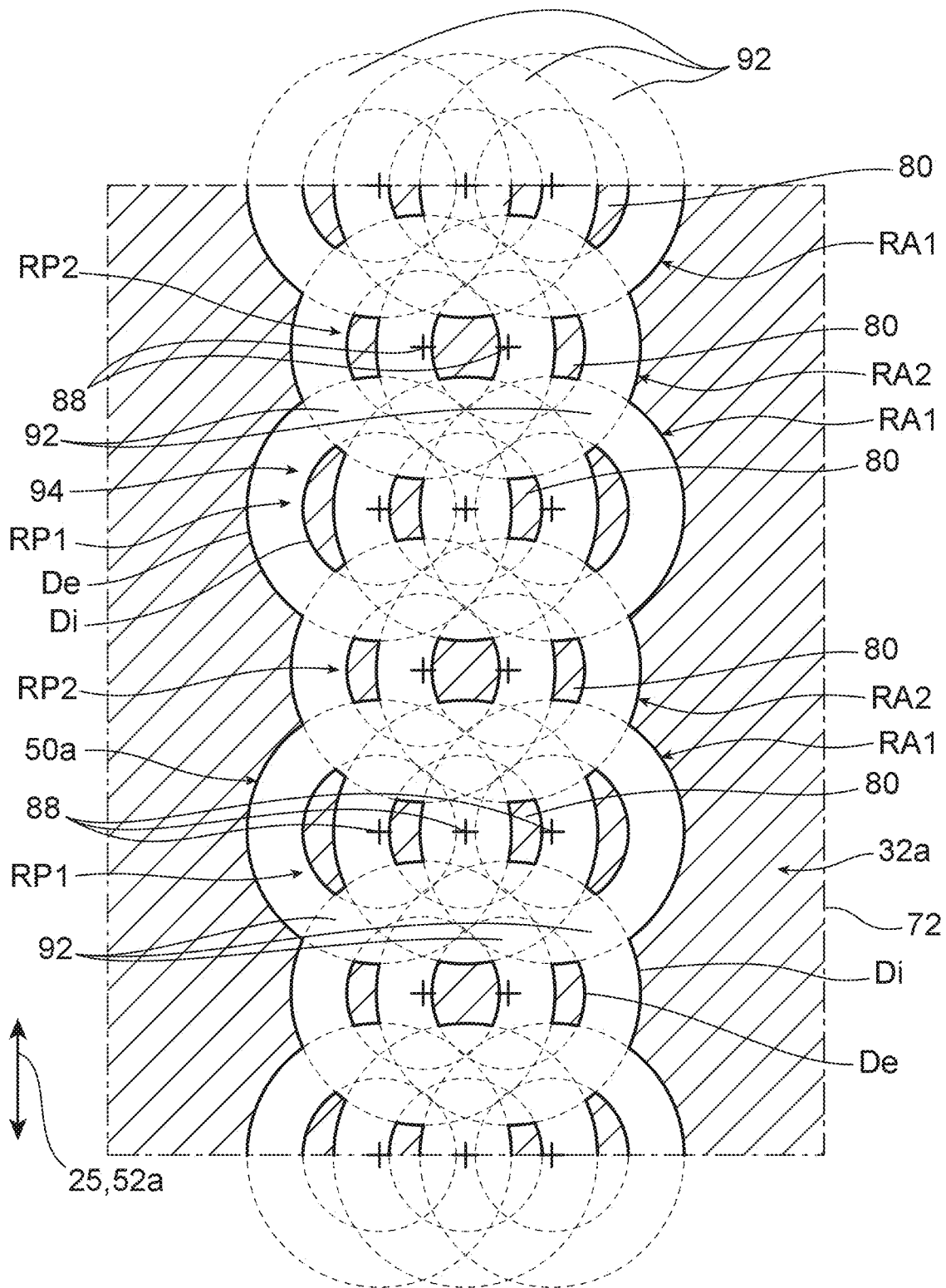
FIG. 8 is a view depicting the whole repeated machining enabling the studs shown in FIG. 5 to be obtained.

FIG. 8 shows as a cross-section the machining axes 88 which are made in a staggered manner. These axes 88, represented by dots in this cross-section view orthogonal to the studs 80, also form the centres of the rings 92 corresponding to the combined fingerprints coming from the repeated machining by the chamfering cutter. In this regard, it is noted that in the internal passage 50a, a space 94 is defined between the remaining studs 80. In cross-section in any plane orthogonal to the studs 80, this space 94 has thus a geometry exclusively defined by the set of rings 92 which partially cover each other, and the centres 88 of which are arranged in a staggered manner. Of course, each of these rings 92 has an internal diameter "Di" and an external diameter "De" corresponding to those of the cutter 86. Incidentally, it is noted that the external diameter "De" is preferably between 20 and 50 mm, whereas the internal diameter "Di" is preferably between 5 and 20 mm.

More precisely, the rings 92 are distributed in rows of rings RA1, RA2 which alternately succeed each other along the first direction 52a, each row being substantially straight and parallel to the transverse direction 60. In the passage 50a, these are thus several tens of rows of rings which succeed each other along the first direction 52a.

To obtain the desired configuration of the studs 80, the first rows of rings RA1 each comprise four rings 92, whereas the second rows of studs RA2 each comprise three rings 92. However, the geometry of these rows can differ, depending on the desired parameters as the stud size, the lubricant passage cross-section, etc.

Back to FIG. 2, during the engine operation, the lubricant circulating through the circuit 56 is introduced into the first internal passage 50a, in the first direction 52a directed radially outwardly. In this stage, the lubricant has a high temperature. A heat exchange is thereby performed between this lubricant fitting the studs 80 of the first passage 50a, and the secondary flow fitting the external surface of the front side and back side walls. The lubricant, after it has been redirected through the bend 54 into the second passage 50b, undergoes in the latter an analogous cooling, still through heat exchange with the secondary airflow and circulating along the second main flow direction 52b. Then, the cooled lubricant is extracted from the vane 24, and redirected through the closed circuit 56 to elements to be lubricated and/or to a lubricant tank from which cooled lubricant is pumped to lubricate elements.

Figure 9:
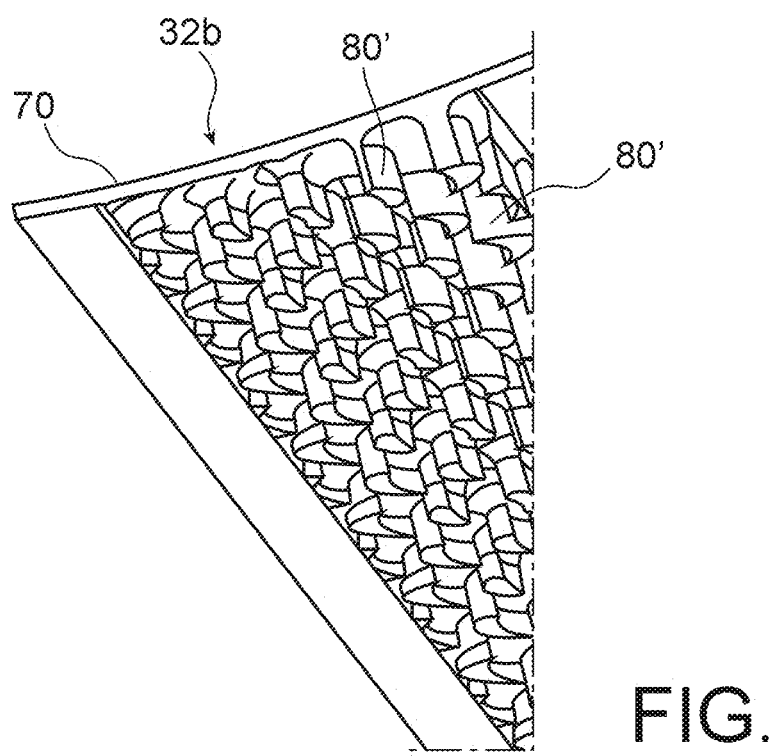
FIG. 9 is a perspective view of a part of a cap of the vane aerodynamic part, according to another preferred embodiment of the invention.
Figure 10:
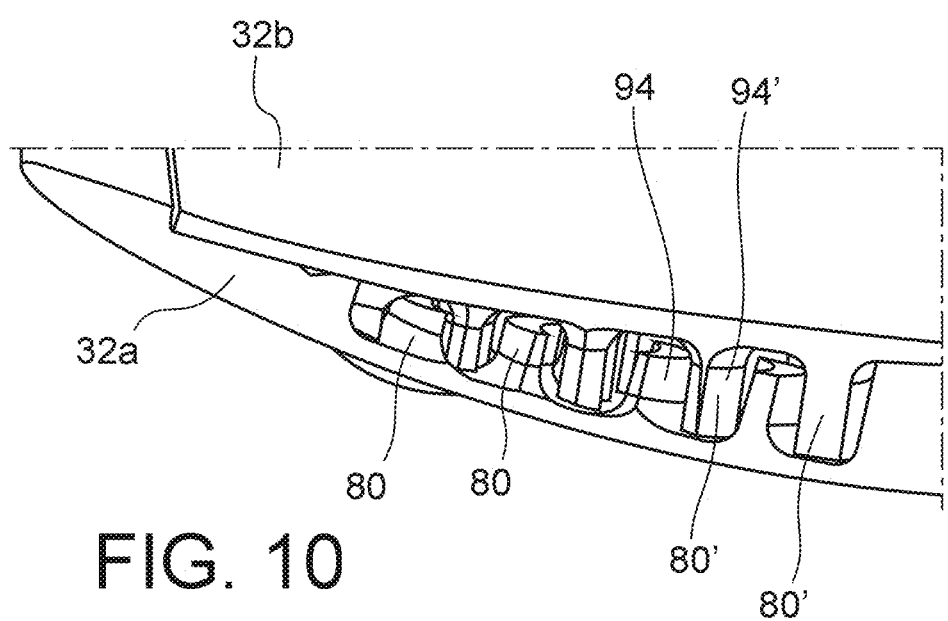
FIG. 10 is a perspective partial view showing the nesting of the studs within the lubricant cooling internal passage.

It is noted that in another preferred embodiment of the invention, the studs 80 could be on the cap 32b, and not only on the vane body 32a. Still according to another preferred embodiment shown in FIGS. 9 and 10, studs could be provided identically or similarly on the cap 32b and on the vane body 32a. More precisely, studs 80 are provided on the vane body 32a as has been previously described, and additional studs 80' are provided identically or similarly on the cap 32b closing the body. Consequently, between the additional studs 80', the space has a geometry which also results from the combination of a set of additional rings (not represented).

To increase the wet surface, it is preferentially provided that the studs 80 of the body 32a penetrate the space 94' defined between the additional studs 80', and reversely, that the additional studs 80' of the cap 32b penetrate the space 94 defined between the studs 80. Alternatively, every two studs 80 and additional studs could be facing each other, and possibly attached to each other at their facing ends.

Of course, various modifications could be provided by those skilled in the art to the invention just described, only by way of non-limiting examples. In particular, the technical characteristics specific to each of the embodiments described above can be combined with each other, without departing from the scope of the invention. Finally, it is noted that in the case not illustrated of the inlet guide vanes to straighten the airflow upstream of the fan, these vanes are arranged in the entire airflow of the fan about a non-rotary air inlet cone, the roots of the vanes being consequently connected to this fixed air inlet cone.

What is claimed is:

1. A guide vane (24) for being arranged in all or part of an airflow of a fan (15) of an aircraft dual flow turbomachine, the guide vane comprising a root (34), an edge (36), as well as a flow straightening aerodynamic part (32) arranged between the root and the edge of the vane, said aerodynamic part of the vane including at least one lubricant cooling internal passage (50a, 50b) partly delimited by a front side wall (70) and a back side wall (72) of the vane, flow disturbing studs (80) made as a single piece with one of the front side (70) and back side (72) walls passing through said passage, wherein in any section plane orthogonally passing through the studs (80), a space (94) defined between these studs has a geometry exclusively defined by a set of rings (92) with a same dimension, partially covering each other and each partly delimiting at least two of these studs (80).

2. The vane according to claim 1, wherein in said section plane, each stud (80) is delimited by four sides (82) each having an arc of circle shape.

3. The vane according to claim 1, wherein said set of rings (92) is made by alternating first and second rows of rings (RA1, RA2) partially overlapping each other and succeeding each other along a span direction (25) of the vane, each first row (RA1) preferably comprising a number N of rings (92) and each second row (RA2) preferably comprising a number N−1 of rings (92), the centres (88) of these rings being disposed in a staggered manner so as to define alternating first rows of studs (RP1) each comprising a number N+1 of studs (80) and second rows of studs (RP2) each comprising a number N of studs (80).

4. The vane according to claim 1, wherein the rings (92) of the set have an external diameter between 20 and 50 mm and an internal diameter between 5 and 20 mm.

5. The vane according to claim 1, wherein said one of the front side and back side walls (70, 72) equipped with the studs (80) is part of a body (32a) of the vane, or a cap (32b) for closing this body.

6. The vane according to claim 1, wherein the other of the elements from the front side and back side walls (70, 72) is made as a single piece with additional flow disturbing studs (80'), and in that in any section plane orthogonally passing through the additional studs (80'), the space (94') defined between these additional studs has a geometry exclusively defined by a set of additional rings with a same dimension, partially covering each other and each partly delimiting at least two of these additional studs (80').

7. The vane according to claim 1, wherein the additional studs (80') penetrate the space (94) defined between the studs (80), and in that the studs (80) penetrate the space (94') defined between the additional studs (80').

8. An aircraft turbomachine (1), preferably a turbojet engine, comprising a plurality of guide vanes (24) according to claim 1, arranged downstream or upstream of a fan (15) of the turbomachine.

9. A method for manufacturing a guide vane (24) for being arranged in all or part of an airflow of a fan (15) of an aircraft dual flow turbomachine, the guide vane comprising a root (34), an edge (36), as well as a flow straightening aerodynamic part (32) arranged between the root and the edge of the vane, said aerodynamic part of the vane including at least one lubricant cooling internal passage (50a, 50b) partly delimited by a front side wall (70) and a back side wall (72) of the vane, flow disturbing studs (80) made as a single piece with one of the front side (70) and back side (72) walls passing through said passage, comprising a step of making the studs (80) by repeatedly machining said one of the front side (70) and back side (72) walls using a chamfering cutter (86), this step being implemented such that the remaining parts not machined by said chamfering cutter form said studs (80).

10. The method according to claim 9, wherein the repeated machining using the chamfering cutter (86) is made along parallel machining axes (88, 88a, 88b), preferably arranged in a staggered manner.

* * * * *